(12) United States Patent
Teichert

(10) Patent No.: US 10,487,802 B2
(45) Date of Patent: Nov. 26, 2019

(54) LIFTING DEVICE FOR CONNECTING TWO ROTOR BLADE SEGMENTS OF A WIND TURBINE

(71) Applicant: PP Energy ApS, Nordborg (DK)

(72) Inventor: Paul Teichert, Sydals (DK)

(73) Assignee: PP Energy ApS, Nordborg (DK)

( * ) Notice: Subject to any disclaimer, the term of this patent is extended or adjusted under 35 U.S.C. 154(b) by 148 days.

(21) Appl. No.: 15/624,129

(22) Filed: Jun. 15, 2017

(65) Prior Publication Data

US 2017/0284372 A1 Oct. 5, 2017

Related U.S. Application Data

(63) Continuation of application No. 14/124,415, filed as application No. PCT/DK2012/000065 on Jun. 6, 2012, now Pat. No. 9,714,642.

(30) Foreign Application Priority Data

Jun. 9, 2011 (DK) .................................. 2011 00440
Nov. 8, 2011 (DK) .................................. 2011 00866

(51) Int. Cl.
  *F03D 80/70* (2016.01)
  *F03D 13/10* (2016.01)
  *B66C 1/10* (2006.01)
  *F03D 1/06* (2006.01)

(52) U.S. Cl.
  CPC .............. *F03D 13/10* (2016.05); *B66C 1/108* (2013.01); *F03D 1/0658* (2013.01); *F03D 80/70* (2016.05); *F05B 2230/604* (2013.01); *F05B 2240/302* (2013.01); *F05B 2260/30* (2013.01); *Y02E 10/721* (2013.01); *Y02P 70/523* (2015.11); *Y10T 29/37* (2015.01); *Y10T 29/49337* (2015.01)

(58) Field of Classification Search
  CPC .......... F03D 11/04; F03D 13/20; F03D 80/70; F03D 1/0658; F03D 1/001; B66C 1/108; F05B 2230/604; F05B 2260/30; F05B 2240/302
  See application file for complete search history.

(56) References Cited

U.S. PATENT DOCUMENTS

| 7,293,959 B2 * | 11/2007 | Pedersen | F03D 1/0633 416/23 |
| 2005/0019166 A1 * | 1/2005 | Bervang | B66C 1/108 416/244 A |
| 2009/0016932 A1 * | 1/2009 | Curcio | B01F 13/0064 422/68.1 |

FOREIGN PATENT DOCUMENTS

DE  20109835 U1 *  1/2002  ............. B66C 1/108

* cited by examiner

*Primary Examiner* — Ryan J. Walters
(74) *Attorney, Agent, or Firm* — McCormick, Paulding & Huber LLP

(57) ABSTRACT

A lifting device for connecting two rotor blade segments of a wind turbine at the location of the wind turbine is adapted to move in the longitudinal direction of the rotor blade. The lifting device includes a frame structure, means for supporting and guiding the frame structure in relation to the rotor blade, means for lowering and/or lifting the frame structure in relation to the rotor blade, and means for lifting and/or lowering a rotor blade segment.

19 Claims, 9 Drawing Sheets

LIFTING DEVICE FOR CONNECTING TWO ROTOR BLADE SEGMENTS OF A WIND TURBINE

CROSS REFERENCE TO RELATED APPLICATIONS

This application is a continuation of U.S. application Ser. No. 14/124,415, filed on Feb. 14, 2014, which is the National Stage of International Patent Application No. PCT/DK2012/000065, filed on Jun. 6, 2012, which claims priority to Danish Patent Application No. PA 2011 00440, filed Jun. 9, 2011, and Danish Patent Application No. PA 2011 00866, filed Nov. 8, 2011, each of which applications is hereby incorporated by reference in its entirety.

FIELD OF THE INVENTION

The present invention relates to a lifting device for guiding the connection of two rotor blade segments of a wind turbine at the location of the wind turbine.

The invention further relates to a lifting assembly for connecting two or more rotor blade segments.

Additionally, the invention relates to a method for connecting two rotor blade segments of a wind turbine.

BACKGROUND OF THE INVENTION

The size, shape and weight of rotor blades are factors that contribute to the energy efficiency of wind turbines. An increase in the rotor blade size increases the energy production of a wind turbine, while a decrease in weight also furthers the efficiency of a wind turbine. Furthermore, as rotor blade sizes grow, extra attention needs to be given to the structural integrity of the rotor blades.

In recent years wind turbines have grown significantly in size and the outer shape of the rotor blades has changed to a complex structure. Not only the thickness and the width change from the hub end to the tip end and from the leading edge to the trailing edge. The blade may also be pre-bent, angled, and/or twisted.

In order to facilitate transport of such large blades it is envisaged that the blades are made from a plurality of blade segments, which are assembled at the erection site of the wind turbine. There is a need in the art to ship the rotor blade in segments and then join the segments at the location of the wind turbine. It is not only a problem to transport the large rotor blades to the erection site; also the suspension of these large rotor blades is a problem.

A segment divided rotor blade comprises a plurality of blade segments such as two, three, four, five, six or any other number. A segment divided rotor blade typically comprises one hub blade segment, one tip blade segment and between zero and a plurality of intermediate blade segments.

Segment divided rotor blades furthermore have the advantage that the tip segment of a rotor blade can be replaced.

Wind farms are often situated in remote landscapes, on hill-tops or offshore locations; that is, locations that can be difficult to access. Heavy cranes can cause substantial damage to the ground and access roads. Offshore installation is often using a jack-up rig, a type of a mobile platform crane that is able to stand still on the sea floor resting on a number of supporting legs.

Large cranes and jack-up rigs are inherently costly, and difficult to transport, deploy, operate and demobilise. In addition, they can only be deployed in low-level wind conditions.

The geometry and the vulnerability of the blades make it difficult to position and assemble the blade segments and it is necessary to use several cranes, and different techniques for handling ropes, wire etc.

SUMMARY

It is an objective of the invention to provide a lifting device for connecting two or more rotor blade segments in an easy and cost-efficient way without damaging blade or gear and in a safe manner.

It is an objective of the invention to provide a lifting device for use not only when the wind turbine is being erected but also for use as a lifting device for replacement of a rotor blade segment. The tip segment of the rotor blade is the part of the blade which is exposed to maximum speed and therefore has a particular need to be repaired or replaced.

A lifting device may also be used on already mounted rotor blades for replacing, repairing or servicing a blade segment etc., if a tip segment needs to be upgraded or retrofitted for adjustment of its performance e.g. elongation of the tip segment, a new design of the tip segment or adding new feature as for example better aerodynamic, noise reducing elements etc.

With the increasing height and size of wind turbines and particularly of sea based wind turbines and their rotor blades, the material and design structures of the rotor blades become relatively light, thus becoming a major challenge for the design of a lifting device.

It is therefore an objective to provide a lifting device with a relatively light design structure and using relatively light materials while observing safety standards. With the increasing heights and sizes of wind turbines, the above-mentioned objectives have become increasingly important.

Furthermore an objective of the present invention is to provide a lifting device that gives as small a pressure and mass effect on the rotor blade as possible.

Even further, it is an objective of the present invention to provide a lifting device that may be moved up and down along the rotor blade in a safe and secure manner, guided by the rotor blade, and whereby the device is moving in a smooth manner along the rotor blade and two blade segments may be assembled in a précis, controlled manner without damaging the blade.

These and other objectives are achieved by the invention as explained in detail in the following.

In a first aspect, the invention relates to a lifting device for connecting two rotor blade segments of a wind turbine, said lifting device being adapted for being moved in the longitudinal direction of the rotor blade, the lifting device comprising: a frame structure, means for supporting and guiding the frame structure in relation to the rotor blade, means for lowering and/or lifting the frame structure in relation to the rotor blade and means for lifting and/or lowering a rotor blade segment.

A segment divided rotor blade could comprise a plurality of blade segments such as two, three, four, five, six or any other number. In the present context the term "connecting two rotor blade segments" should be interpreted to mean connecting two consecutive segments in a guided manner. If, for example, the rotor blade only comprises two segments, it will be a device for connecting the tip blade segment to the hub blade segment. If the rotor blade comprises, for example, three segments, the device will first be used for connecting the intermediate blade segment with the hub blade segment. After connecting these two segments, the device could be used for connecting the tip blade segments to the intermediate segment which is then already connected to the hub blade segment. If the rotor blade comprises four segments the device will firstly connect intermediate segment to hub segment, intermediate to intermediate and finally the tip segment to the second intermediate segment etc.

In the present context the term "frame structure" should be interpreted to mean a structure which could have an open configuration, e.g. a U-configuration or is adapted to be opened, e.g. by having a releasable frame part or a pivotal frame part or the frame structure could have a closed frame structure.

The means for lowering and/or lifting the frame structure in relation to the rotor blade may comprise suspension means, by means of which the frame may be suspended. In a preferred embodiment the frame may be suspended in a triangular configuration wherein said triangular configuration comprises two suspension locations in a first zone located at the frame zone closest to the tower and a further suspension location in a second zone located along a side of the frame, which is configured to extend along the pressure side of the rotor blade. Hereby, it is achieved that, when placed on the rotor blade and supported and guided by the rotor blade, the device will be hanging in a well-balanced manner, for instance due to the fact that the centre of gravidity of the device will be lying within the triangular suspension arrangement, e.g. within the triangle defined by three support points.

In particular it is noted that such advantages are achieved when the device is used in connection with a wind turbine, where the rotor blades have been put into a position which is referred to as the emergency position, e.g. with the rotor blades turned in such a manner that the rear or trailing edge of the rotor blade is turned towards the wind turbine tower and the front or leading edge of the rotor blade is facing away from the wind turbine tower, in which case the influence by the wind will be minimized. In such cases the first end of the frame of the device will be situated near the wind turbine tower, when the rotor blade is pointing downwards, and the second end of the frame of the device will be situated near the front edge of the rotor blade. It will be understood that the first end of the frame may also be referred to as the rear end and that the second end of the frame also may be referred to as the front end. According to this arrangement, lines, cables or wires that are suspending the device in the triangular arrangement, will be located where they will not interfere with the rotor blade, which might otherwise harm the surface of the rotor blade and interfere with the proper operation of the device. Furthermore, the device will also be suspended in a well-balanced manner, with two suspension points placed at the frame of the device facing the wind turbine tower and with the further suspension point placed at the side of the frame adjacent to the pressure side of the rotor blade. The rotor blade will thus be located within or essentially within the triangle defined by the suspension points. Further, it is noted that by having the single further suspension point on the frame near the pressure side of the rotor blade, the curvature and the pre-bent of the rotor blade can be taken into consideration, i.e. the fact that rotor blades tend to be designed in such a manner that the rotor blade will curve from root to tip, with the tip being curved away from the axis in the pressure direction. Since only a single suspension point is used at the pressure side of the rotor blade, this can be located at the side of the frame corresponding to the concave side of the rotor blade, i.e. the pressure side, whereby it can be ensured that the line, cable or wire connected to this suspension point will not get in contact with the rotor blade.

It is further noted that when reference is made to suspension locations, of which three are located at the frame, it will be understood that more than one line, cable or wire can be fixed to each of such suspension locations, e.g. in a parallel suspension arrangement. Furthermore, it will be understood that two or more lines, wires, cables, hoisting means, etc. can be connected to the frame in such manner that in the essence they will constitute a single suspension location, for example two or more lines, wires, cables, hoisting means, etc. that are connected to the frame at a relatively short distance, e.g. a short distance in relation to the length or width of the frame.

According to an embodiment, at least one of said hoisting means or fixing means for said lines, cables or wires may be adapted for being moved along the frame e.g. within said first zone and/or said second zone, respectively.

Hereby, it is achieved that one or more of the corners of the triangular arrangement may be adjusted, if necessary, for example in order to adjust the position of the frame and/or the balance of the frame, while still maintaining the basic triangular suspension arrangement.

According to a still further advantageous embodiment, at least one of said hoisting means or fixing means for said lines, cables or wires comprises means for adjusting or influencing the effective suspension location, for example in the form of a fixed line guiding arm, an adjustable line guiding arm, an outrigger or the like. Hereby, it is achieved that a corner of the triangular arrangement may be placed optionally in relation to the frame and/or adjusted in relation to the frame.

The lifting device according to the invention may further comprise a frame structure comprising a first part of a coupling guide for guiding a coupling of a first rotor blade segment to a second rotor blade segment.

In one embodiment the first part of the coupling guide includes inclined end faces for cooperation with correspondingly inclined end faces of an adjacent second part of a coupling guide.

Hereby, it is achieved that the second part of the coupling guide will automatically be coupled to the first part of the coupling guide upon lifting the second rotor blade segment. The inclined end faces secure a fast and self adjusting coupling.

In one embodiment the first part of the coupling guide includes an opposite angling of the end face of the coupling guide and the second part of the coupling guide comprises a complementarily angled end face.

Hereby, it is achieved that the respective pairs of end faces will act to urge the end of the second part of the coupling guide inwardly. In this manner, the first and the second coupling guide parts permit the respective coupling guide parts to move into engagement.

The end faces may be other than planar and may be concave, convex, V-shaped or other shapes, provided that the shapes permit movement relative to each other.

The end faces may have a three-dimensional inclination whereby the two rotor blade segments can be angled relative to each other.

In one further embodiment the frame structure comprises a plurality of first parts of a coupling guide for coupling a first rotor blade segment to a second rotor blade segment.

In a preferred embodiment the coupling guide is a self adjusting coupling guide.

Hereby, it is achieved that by means of the lifting device the user may be able to connect two or more rotor blade segments of a wind turbine direct on the ejected wind turbine since the lifting device can be moved up and down the rotor blade, guided by the rotor blade. The means for supporting and guiding the lifting device in relation to the rotor blade are configured for preferably automatically adapting to the size and shape of the rotor blade, which vary considerably along the length, thereby facilitating that the rotor blade can be accessed along virtually the whole length. Furthermore, it is achieved that the lifting device is supported against parts of the rotor blade, which are suited therefore, i.e. regions at or near the front edge of the rotor blade and at or near the rear edge of the rotor blade, and the support is maintained at these regions, even though these regions move in dependence of the variations of the size and shape of the rotor blade along its length. This is achieved due to e.g. the nature of the contact means, that allows the contact means to move along e.g. the path of the rotor blade that is suitable as support for the lifting device, without undue friction and with ease.

The lifting device according to the invention that may e.g. carry a tool device and/or one or more persons, may be located in any vertical position along a wind turbine rotor blade, controlled by a person at the lifting device or at ground level, e. g. by controlling the means for lowering and/or lifting the frame device in relation to the rotor blade.

Thus, a large and heavy crane is avoided, since a person using the lifting device according to the invention may access virtually any desired position in relation to the wind turbine rotor blade. Hereby any necessary work may be performed using a relatively light construction.

The lifting device according to the invention may be transported to the location of the rotor blade as one part or separated in two or more parts.

According to an embodiment said means for supporting and guiding the lifting device in relation to the rotor blade are configured for being adjusted to the rotor blade during movement of the lifting device in order to maintain controllable contact at said regions.

According to yet another embodiment, at least one of said plurality of contact means may be adapted for contacting the rotor blade at a plurality of points and/or at adjoining points.

Hereby, it is achieved that the contact means can move along the surface of the rotor blade while providing the necessary support against the surface of the rotor blade since the at least one contact means is adapted for contacting the rotor blade at a plurality of positions and/or at adjoining positions. Thus, the rotor blade will be able to withstand the load transferred to it by the contact means while it will still be possible for the contact means to be displaced along the surface with a minimum of friction.

According to an embodiment, at least one of said contact means may comprise brush support means for contacting the rotor blade.

Hereby, it is achieved that the lifting device may be supported against the rotor blade in a manner that spreads the load over a relatively wide area, e.g. due to the plurality of bristles used and/or due to a plurality of brushes being mutually connected or carried by a common carrier, whereby the contact means may readily move in any direction. The brushes may have different lengths of bristles, the length of the bristles preferably corresponding to the shape of the rotor blade. Hereby, it is achieved that the lifting device may be supported against the rotor blade in a manner that spreads the load over a relatively wide area. Preferably, brush support means as used in e.g. the conveying field may be used, for example industrial brushes as supplied by the company August Mink KG, Germany.

According to a further embodiment, one of said contact means may comprise belt, drum, roller or similar support means for contacting the rotor blade.

Hereby, it is achieved that the lifting device may be supported against the rotor blade in a manner that spreads the load over a relatively wide area.

According to a still further embodiment, said belt, drum, roller or similar support means for contacting the rotor blade may comprise a plurality of parallel belts, chains, drums, rollers or similar means.

Hereby, it is achieved that the device may be supported against the rotor blade in a manner that spreads the load over a relatively wide area.

Preferably, at least one of said contact means may comprise a plurality of balls, rollers or the like.

Hereby, it is achieved that the lifting device may be supported against the rotor blade in a manner that spreads the load over a relatively wide area and whereby the contact means may readily move in any direction.

Alternatively, at least one of said contact means may comprise fluid means, e.g. gas, air, for example in the form of pneumatic or air cushioning means, liquids, etc. for facilitating contact to the surface of the rotor blade.

Hereby, it is achieved that the device may be supported against the rotor blade in a manner that spreads the load over a relatively wide area and whereby the contact means may readily move in any direction, i.e. omnidirectionally.

According to a particular embodiment, said means for supporting and guiding the lifting device in relation to the rotor blade may comprise means such as strain gauges, weighing cells, etc. for determining contact load at said regions of the rotor blade, thereby facilitating detection and/or measurement of unbalance, variations in rotor blade dimensions, e.g. width, wind pressure, etc.

Hereby it is achieved that the load put onto the surface of the rotor blade by the individual contact means can be determined and that the lifting device can be adjusted, e.g. the means for supporting the contact means, in such a manner that the load is kept below predetermined limits, that all contact means take a part in the support, i.e. no un-loaded contact means, and that the load is distributed evenly or essentially evenly. Thus, a smooth movement of the device along the rotor blade is achieved, when the load or pressure of each of the plurality of contact means is controlled, since the friction is controlled accordingly. Thus, abrupt movements, abrupt stops etc. can be avoided.

According to a further embodiment, said means for supporting and guiding the lifting device in relation to the rotor blade may comprise means for detecting an edge of the rotor blade.

Hereby, it is facilitated in an expedient manner that the contact made by the contact means is established and maintained within the above-mentioned regions, since these can be determined in relation to the edge or edges of the rotor blade.

Advantageously, said means for detecting an edge of the rotor blade may comprise measuring or detecting means, such as for example optical sensing means, e.g. laser means, photo cells, optical scanning means, etc., radiation means such as X-ray means, sonic detecting means, e.g. ultrasonic means, etc., radar means, etc.

Hereby, the edge or edges of the rotor blade can be detected with a high degree of accuracy and by means of proven components and systems.

Advantageously, the lifting device may comprise control means for controlling said means for supporting and guiding the lifting device in relation to the rotor blade on the basis of input signals provided by said means for determining contact load at said regions of the rotor blade and/or input signals provided by said means for detecting an edge of the rotor blade.

Hereby it is achieved that the lifting device can be controlled to move along the rotor blade in an automated manner, whereby the contact means are kept within the desired regions and whereby the means for supporting and guiding the lifting device in relation to the rotor blade are controlled in such a manner that the load put onto the rotor blade by the contact means is kept within predetermined limits, whereby also a preferable balance is achieved and whereby a reliable, safe and user-friendly operation of the lifting device is achieved, which does not involve jerks, abrupt movements, abrupt stops, etc.

Preferably, said frame structure may have an open configuration or is adapted for being opened, e.g. by having a releasable frame part and/or one or more frame parts that are pivotal.

Hereby, it is achieved that the lifting device can readily be transferred to the rotor blade at a convenient place along the length of the rotor blade in a relatively simple manner instead of being placed at the rotor blade at the tip of the blade, where the distance to the tower is relatively large, thereby making such an operation relatively complex, when the size of currently used wind turbines is taken into consideration. Furthermore, as regards a frame structure that is configured for being opened, it is noted when such a frame structure is closed again.

Preferably, said means for supporting and guiding the lifting device in relation to the rotor blade may comprise a rear guide and a support arrangement comprising at least one arm for establishing contact at said regions at or near the rear edge of the rotor blade.

Preferably, said rear guide and support arrangement may be movable in the longitudinal direction of the lifting device.

Advantageously, said rear guide and support arrangement may comprise at least two arms for establishing contact at said regions at or near the rear edge of the rotor blade, wherein said arms may be pivotal in relation to the frame structure, whereby variations in the width of the rear edge of the rotor blade can be accommodated and whereby further positioning of the lifting device in relation to the rotor blade is adjustable.

Preferably, said means for supporting the lifting device in relation to said rotor blade may comprise a front guide and support arrangement comprising one or more of said plurality of contact means, and wherein said front guide and support arrangement may be movable, e.g. comprising one or two pivotal arms or the like for facilitating opening and closing of said frame structure.

According to a further embodiment, the contact means, e.g. belts or the like, of said front guide and support arrangement may comprise contact detection means, for example sensors, switching means, etc., for detecting the contact established between the contact means and the rotor blade.

Hereby, it is achieved that it is detected if e.g. the contact means, which normally rests against the rotor blade on the front side, is not in contact with the surface of the rotor blade, which means that the contact means, which rests against the other side, is taking the full load of the front part of the frame. This has the undesired effect that the contact pressure may be undesirably high and furthermore that the frame may abruptly move to a position where both contact means are resting, which is undesirable for several reasons. Since such an undesirable situation can be detected in accordance with this embodiment, measures can be taken to correct the situation and achieve that e.g. both front contact means are in a correct contact with the rotor blade.

Preferably, said front guide and support arrangement may be adapted for being tilted up or down in order to allow said contact means to adapt to the direction of movement along the front part of the rotor blade.

Hereby, it can be achieved that the front contact means can be guided to maintain a desired contact with the rotor blade in spite of the changing width of the rotor blade front, when the device is moving up or down, which may require that the suspension arrangement, e.g. the arms of the front guide and support arrangement are adjusted, for example up or down by a small angle.

Advantageously, the lifting device may further comprise one or more fenders on the inside of the frame structure. Preferably, the fenders are placed to face each other. Hereby, it can be achieved that any direct contact between frame and rotor blade is as gentle as possible.

Preferably, the frame or the fenders may comprise means for determining and/or measuring the contact load. Hereby, measures can be taken to avoid a situation, where the rotor blade becomes squeezed or wedged in the frame.

Preferably, the fenders may have the shape of cylinders or rollers.

Preferably, the lifting device may further comprise means for supporting the lifting device in relation to a wind turbine tower, where said means for supporting the lifting device in relation to the wind turbine tower are configured for displacing the lifting device in relation to said wind turbine tower, e.g. when the lifting device is transferred to or removed from the rotor blade of a wind turbine.

Hereby, the lifting and lowering of the lifting device along the tower is facilitated and furthermore, the operations performed when the lifting device is transferred to the rotor blade or returned to the tower again are facilitated.

Preferably, said means for supporting the lifting device in relation to the wind turbine tower may be configured for adjusting the position, e.g. the angle of the lifting device in relation to the wind turbine tower.

Hereby, it is achieved in a relatively simple manner that the lifting device can be controlled with high accuracy, when it has, for example, reached a height where it is desired to contact the rotor blade. This may be of particular importance when operating in windy conditions.

Advantageously, said means for supporting the lifting device in relation to the wind turbine tower may comprise means for measuring the support load, for example for each of the tower support arms, e.g. in order to determine load distribution between two or more tower support arms or the like.

Hereby, it can be determined whether, for example, two tower support arms carry essentially the same load or if for some reason, e.g. wind pressure, the influence of the hoisting means, etc., the load is (undesirably) uneven, whereby corrective control steps can be taken.

Still further, the lifting device may comprise a work platform adapted to carry one or more individuals and/or a tool, a robot, an apparatus etc. for connecting the two rotor blade segments.

In accordance with a further embodiment, said means for lifting and/or lowering the lifting device in relation to the rotor blade may comprise hoisting means having power means such as electric motors, electric, electronic, hydraulic and/or pneumatic means and said hoisting means may be adapted for climbing up and down a cable or said hoisting means may be adapted for accumulating the cable, e.g. drum hoisting means.

Hereby, the lifting device will be able to lift and/or lower itself without power assistance from e. g. a hoist located at the wind turbine tower, at a vehicle or at a vessel. Thus, the platform assembly will be able to operate independently, e. g. without concern for power assistance from other devices. This further enhances safe operation, since accidents caused by a power failure at a ground vehicle or at a vessel are prevented. Particularly when operation at sea is concerned, e. g. at sea wind turbines, such an independent configuration is preferable since a support vessel may be unstable, e. g. subjected to waves, current, wind etc. Thus, an arrangement at sea where a vessel provides the elevation by e.g. hoist(s) located on the vessel is prone to accidents and malfunction, and therefore a device comprising power means as mentioned above is advantageous not only in general but especially at sea.

Further, it is noted that even when power supply to such a lifting device is subjected to failure, e. g. when electric power is cut off, a device according to the invention will be able to be manually operated, e. g. to be hoisted to the ground and will in general present a safe work tool for all involved, in particular persons occupying the device.

In a further embodiment the lifting device may further comprise control means for controlling the lifting and/or lowering means.

Such control means may be controlled from a platform as explained above or from e.g. ground level, for example when an automated operation is taking place.

According to an embodiment, said means for lifting and/or lowering the lifting device in relation to the rotor blade may comprise a plurality of hoisting means, wherein one of said plurality of hoisting means is a master hoisting means and wherein the other/others of said plurality of hoisting means is/are controlled in dependence of the master hoisting means.

Hereby it is achieved that the lifting device can be lifted and lowered in such a manner that the lifting device is maintained in a desired state, e.g. horizontally or at a desired angle while being moved up and down and/or that furthermore the load carried by the individual hoisting means is within predetermined limits.

It will be understood, though, that the hoisting means may also be synchronized in relation to each other.

According to a further embodiment, the lifting device may comprise measuring means, e.g. weighing cells, strain gauges, etc. for measuring the load of the hoisting means or of each of a plurality of hoisting means.

Even further, the lifting device may comprise measuring means, e.g. encoders, laser measuring means, etc., for measuring or estimating e.g. the position of the lifting device, the lifting and lowering distances and/or velocity of each of a plurality of hoisting means.

Thus, it will be understood that the hoisting means may be adapted for measuring or calculating the length of the wire, line or cable in order to determine the actual altitude of the device. A calibration of these means may take place, when the lifting device is placed e.g. at ground level.

The means for supporting and guiding, may be in the form of a plurality of wires, lines, cables or the like, which could be connected to or at the upper part of the wind turbine, e.g. at or in the nacelle, at the rotor, for example at the hub, at the nose of the rotor, etc., at the tower etc.

According to a further embodiment the means for supporting and guiding may be in the form of a plurality of cables, lines, or the like which could be connected to a crane or the like that is placed close to the wind turbine.

The hoisting device may be placed at the most suitable place e.g. on the frame or in connection with the frame, at or on the wind turbine, at the ground or a crane may be used.

According to a still further embodiment, the lifting device may further comprise means for automatically adjusting said hoisting means, e.g. automatic levelling means, in order to provide a desired position, e.g. a horizontal position of the frame structure.

Advantageously, the lifting device may be adapted to assist individuals and/or facilitate the use of automated equipment such as robots in performing the connection of two or more rotor blade segments.

Preferably, said lifting device may comprise a control system for automatically controlling actuators, hoisting means etc. of the lifting device on the basis of control input from e.g. gyroscopic sensor(s), pressure sensor(s), optical sensor(s) such as laser sensor(s), strain gauge sensor(s), contact sensor(s) and/or other sensors, detectors and/or measuring means.

According to an embodiment, the control system may be configured for limiting the speed, at which the platform assembly is lowered and/or lifted, when the lifting device is within a predetermined distance from the ground or another base level or within a predetermined distance from e.g. the nacelle.

According to an embodiment, said means adapted for supporting the lifting device in relation to a rotor blade of a wind turbine may be displaceable, e.g. in the lateral direction and/or the longitudinal direction of the lifting device.

Hereby, the lifting device can readily travel along the length of the rotor blade, while the support means are automatically adapted to the actual size and/or shape of the rotor blade. Furthermore, the transfer of the lifting device from the tower to the blade is facilitated in this manner.

Preferably, said front guide and support arrangement may be movable in the longitudinal direction of the lifting device.

Hereby, the control of the position of the contact means in relation to width and/or position of the rotor blade is facilitated.

According to a further aspect of the invention, said means for supporting the lifting device in relation to a nearby structure may be configured for support against said nearby structure at least at two points in the vertical direction, and wherein means for supporting the lifting device at least at one of these points is adjustable in relation to the nearby structure, e.g. the surface of a wind turbine tower.

Hereby, it is achieved that the lifting device can be transported along the surface of the tower, even when the surface comprises obstacles or the like, for example in the form of flanges or the like or in the form of various equipment such as for example antennas that are located at the tower.

Expediently, said means for lifting and/or lowering the lifting device in relation to the rotor blade may be connected to a plurality of lines, cables, wires or the like.

Such wires or lines etc. may be connected to any suitable location on the wind turbine, e.g. the nacelle, the hub, the tower etc., and they may be permanently fixed. Furthermore, it is noted that in accordance with the invention, the lifting device can be operated using three such lines, cables or wires, two connected at or near the rear of the lifting device and one connected to a point along the length of the frame structure, preferably at the end of the frame facing away from the tower, whereby a triangular suspension is achieved. As it is explained herein, the platform assembly may be balanced, e.g. by adjusting the position of one or both of these connection points, for example on the basis of measured parameters and/or gyroscopic inputs. Further, it is noted that with such an arrangement it is achieved that during the operation of the lifting device, the lines or wires will not get in contact with the rotor blade.

According to a further embodiment, the lifting device may further comprise means for changing the direction of one or more of the cables, lines or wires, by means of which the device is hoisted, lifted and/or lowered, thereby altering the balance of the lifting device.

Hereby, a balancing of the lifting device as described above is facilitated.

According to a still further aspect of the invention, the lifting device may further comprise dampening means for performing a dampening action of the platform assembly in relation to said structure, e.g. a wind turbine rotor blade or tower.

Since the lifting device may be used and operated at considerable heights, it is apparent that the structure itself, e.g. the wind turbine, and the lifting device, for example the frame structure, a work platform etc. will be affected by the environment, e.g. influenced by the wind, turbulences, etc. In order to counteract such influences, the device according to any of the embodiments described herein may be equipped with means for effecting a dampening of the undesired influences. Such dampening means may be passive, but preferably or in addition to passive dampening means, active dampening means may be used. Such active dampening means may be controlled by control means, for example integrated with the central control means for the lifting device, and the control of the active dampening means may take place on the basis of input signals from e.g. sensor means, by means of which for example wind speed, turbulence, vibrations etc, may be measured. Hereby it is achieved that the mass of the lifting device including work platform, personnel, tools, etc. may be used to dampen the movements of the structure itself.

Expediently, the lifting device may comprise a control system for automatically controlling actuators, hoisting means etc. of the device on the basis of control input from e.g. gyroscopic sensor(s), pressure sensor(s), optical sensor(s), strain gauge sensor(s) and/or other sensors.

Hereby, highly automated operation of the lifting device is achieved and furthermore, an enhanced user friendliness and an enhanced efficiency is achieved since, for example, the user needs not to attend to various compensative control operations in order to counteract changing wind, changing balance as the device is moved up and down etc., but can concentrate on the work that has to be performed.

According to a further embodiment, said lifting device may be adapted for being permanently fixed at said structure, e.g. at a nacelle of said wind turbine, and adapted for being operated by lowering and transferring the device to a rotor blade segment.

According to a second aspect, the invention provides a lifting assembly for connecting two or more rotor blade segments, the assembly comprising: a lifting device according to the first aspect of the invention, and a fixation part having means for fixation of a rotor blade segment, the fixation part further comprising means for connecting the fixation part to the means for lifting and or lowering a rotor blade segment placed on the lifting device.

According to the second aspect, the invention provides a lifting assembly for connecting two or more rotor blade segments, the assembly comprising: a lifting device according to the first aspect of the invention, and a fixation part having means for fixing a rotor blade segment, wherein the fixation part is detachably attached to the means for lifting and/or lowering a rotor blade segment placed on the lifting device and movable in relation to the frame structure and carried by said frame structure.

It should be noted that a skilled person would readily recognise that the features described in relation to the first aspect of the invention could also be combined with the second aspect of the invention, and vice versa.

The fixation of the fixation part to the rotor blade segment depends on the type of rotor blade and would be a selection to be made by the skilled person, e.g. fixation by vacuum, pressing pads, rubber pads, cautious grip on the longitudinal girder, different types of fittings etc.

According to the second aspect, the invention provides a lifting assembly wherein the fixation part comprises a second part of a coupling guide for guiding a coupling of first and second rotor blade segments. In a preferred embodiment, the coupling guide is a self adjusting coupling guide.

A method for guiding the connection of two rotor blade segments of a wind turbine, whereby a lifting device that comprises a frame structure, means for supporting and guiding the lifting device in relation to said rotor blade, means for lowering and/or lifting the lifting device in relation to the rotor blade and means for lifting and or lowering a rotor blade segment is placed near said wind turbine, essentially at ground or sea level,
- the lifting device is lifted in relation to said wind turbine by means of at least one line, wire or the like connected to said wind turbine or to a crane or crane like structure,
- when the lifting device has reached a suitable level, the rotor blade is contacted by support means at or near the edge of the rotor blade, which support means are movable in relation to said lifting device,
- the lifting device is lifted and/or lowered in relation to the rotor blade while supported and guided by said support means,
- the lifting device is lowered down to an end of a first rotor blade segment,
- means for lifting and lowering a second blade segment is fixed to a fixation part having means for fixing a second rotor blade segment,
- the fixation part with the second rotor blade segment is lifted up to the end of the first rotor blade segment,
- a first part of a coupling guide placed on the lifting device is coupled to a second part of a coupling guide placed on the fixation part,
- a further lift of the fixation part secures self-adjustment of the first and second coupling guide parts, whereby the second rotor blade segment is positioned in a correct angle to the first blade segment.

THE FIGURES

The invention will be described in detail in the following with reference to the drawings, in which FIG. 1 shows a wind turbine and a lifting device for connecting two rotor blade segments.

DETAILED DESCRIPTION

The lifting device and a method for connecting two rotor blade segments will be explained in general with reference to FIGS. 1-4.

FIGS. 1-4 illustrate the lifting device in a schematic matter.

Figure 1:
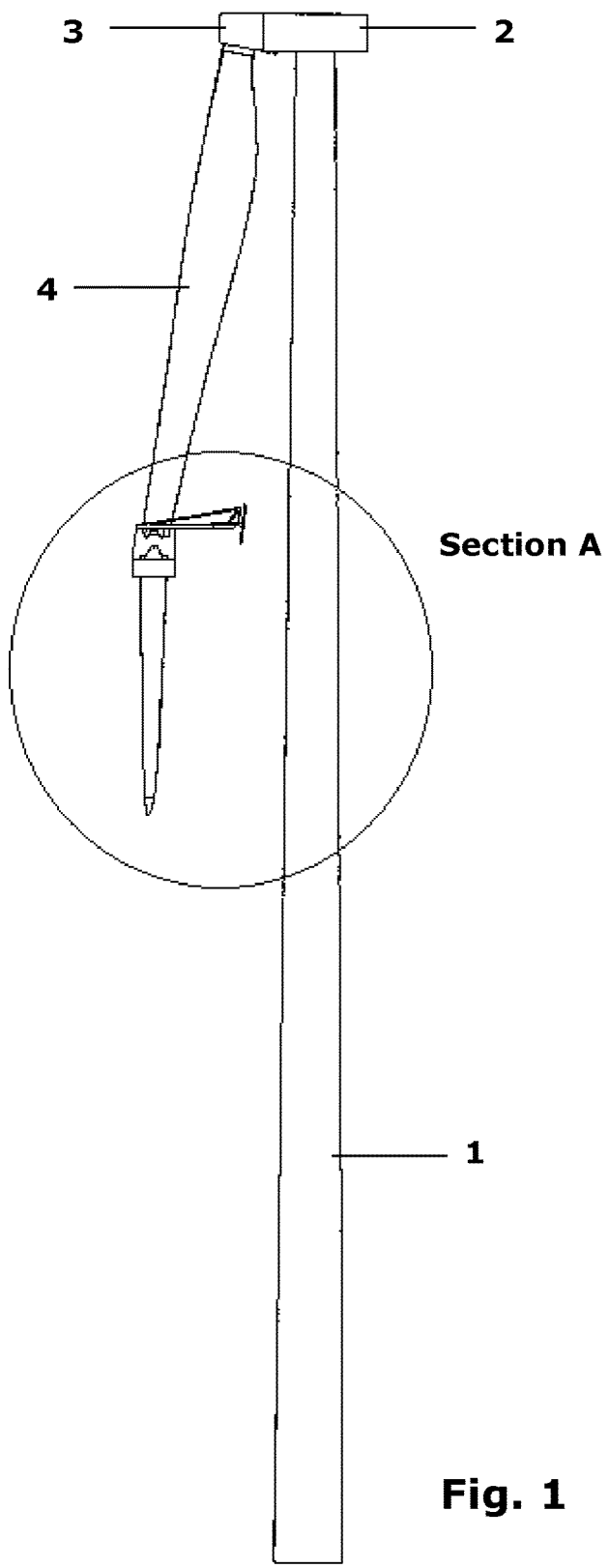

FIG. 1 discloses a wind turbine tower 1 upon which a nacelle 2 is mounted. From the nacelle 2 extends a non-visible main shaft comprising a hub 3 on which a rotor blade (4) is mounted.

In the shown situation only one rotor blade 4 is disclosed. The wind turbine is stopped and the rotor blade 4 shown is in an essentially vertical position and has the rear edge of the rotor blade near the tower 1.

Figure 2:
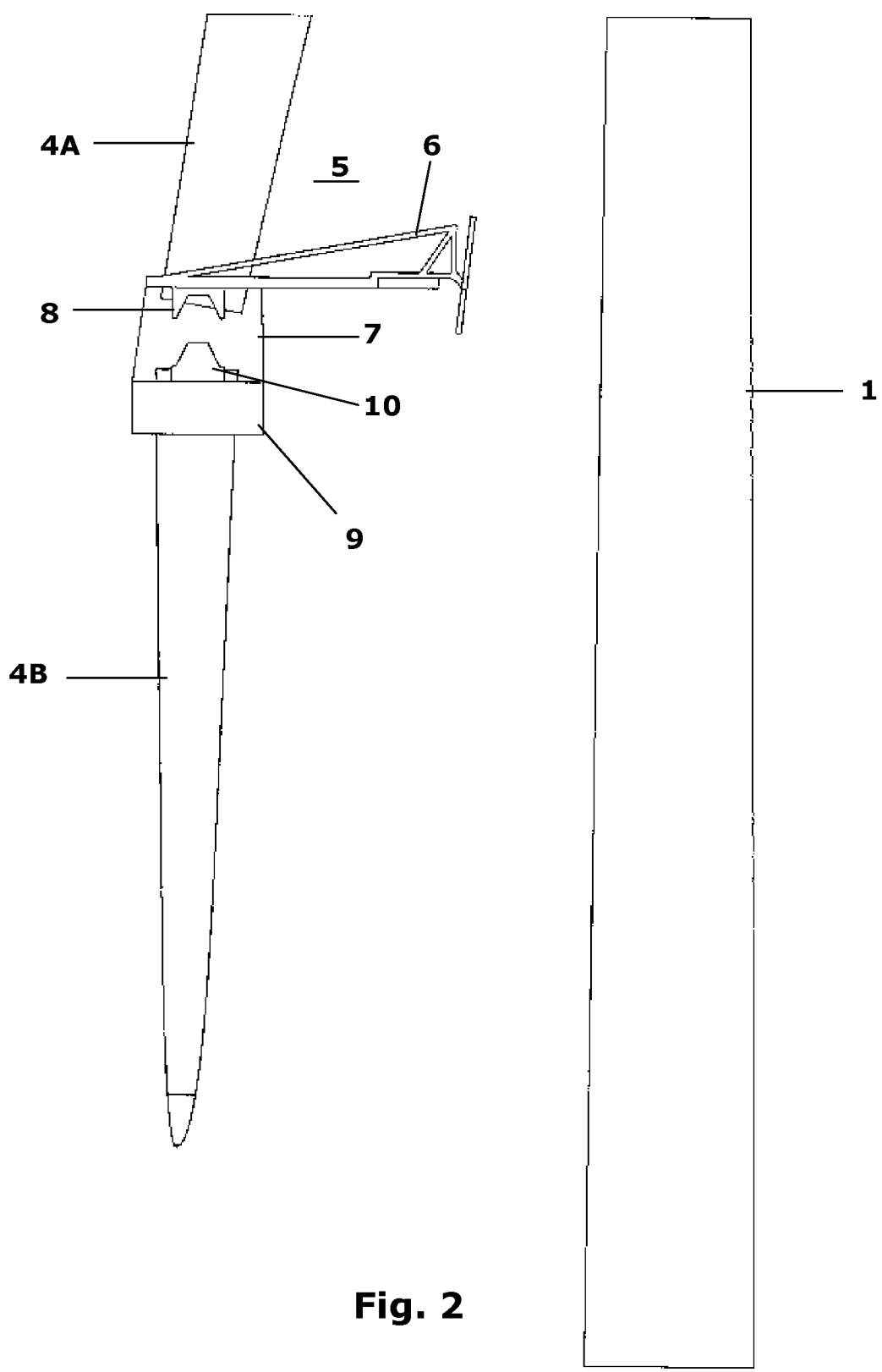
FIG. 2-4 show the section A from FIG. 1 when two rotor blade segments of a wind turbine are being connected.
Figure 3:
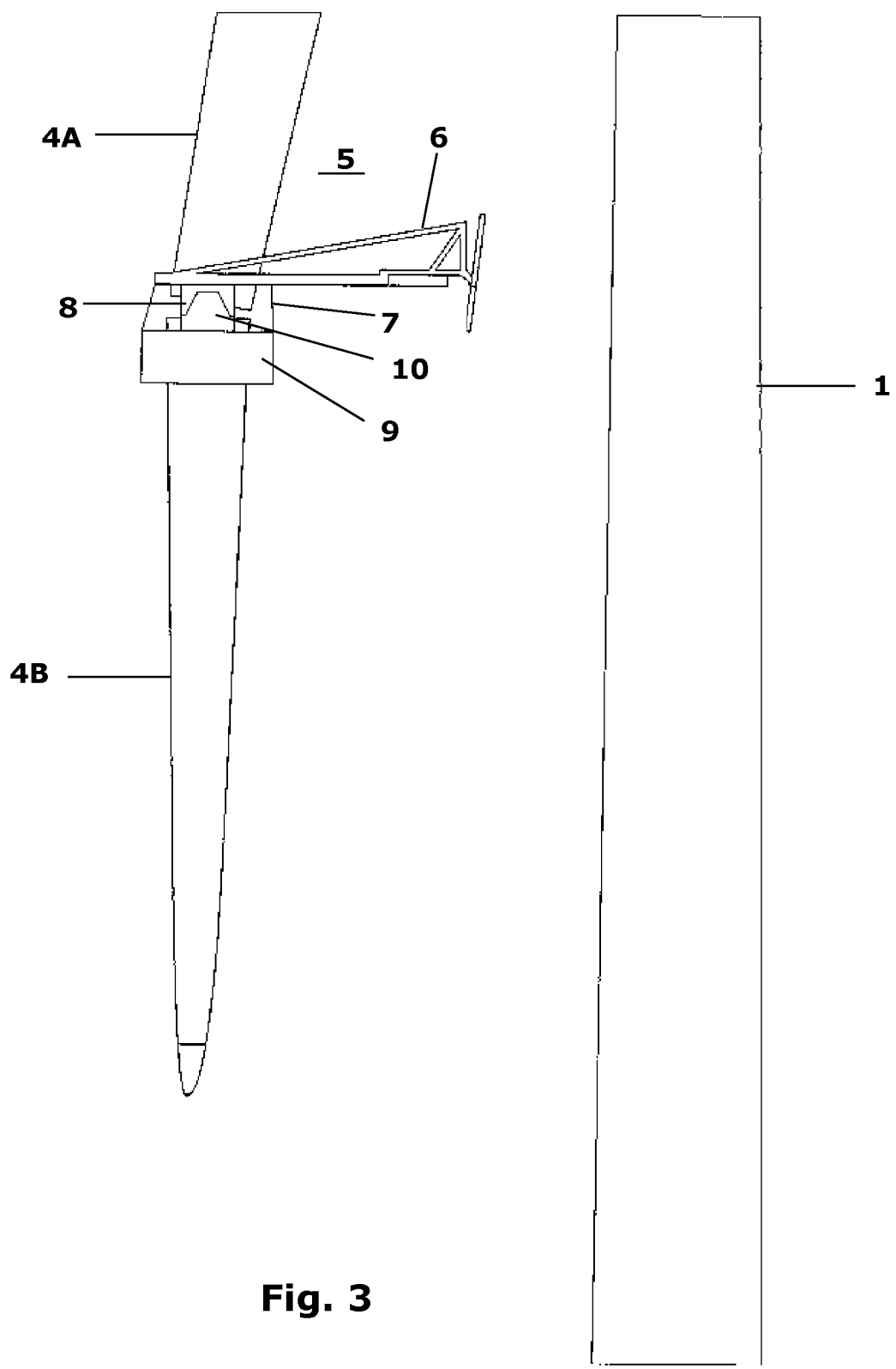
Figure 4:
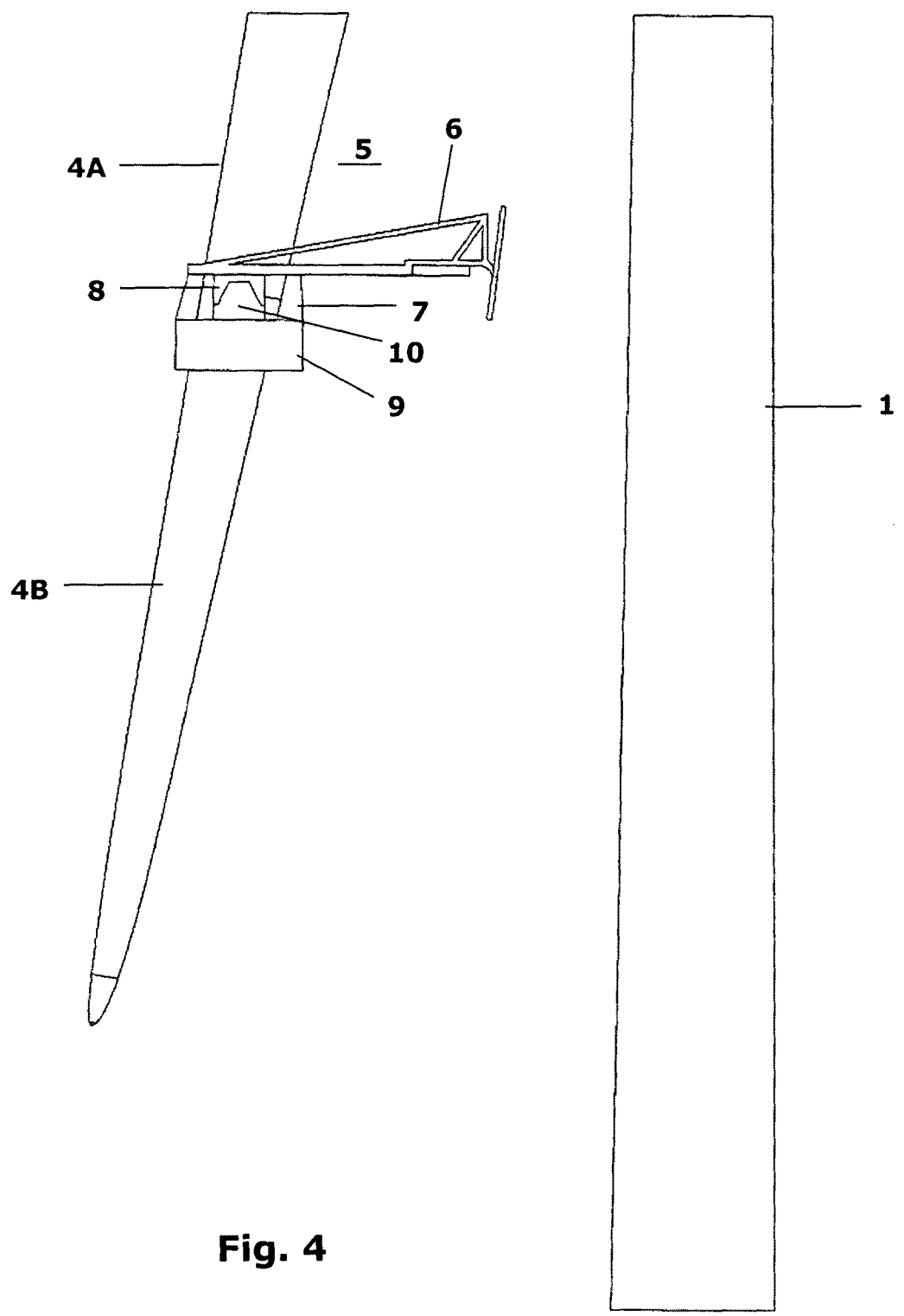

FIGS. 2-4 illustrate the section A from FIG. 1 where two rotor blade segments 4A and 4B are being connected. The figures present a sequence, showing the method for connecting the rotor blade segments 4A, 4B. The lifting device 5 is lowered down to the end of the first rotor blade segment 4A. The FIGS. 2-4 disclose the frame structure 6, but the means for lowering and/or lifting the frame structure in relation to the rotor blade 4 is not disclosed in these figures. A fixation part 9 is fixed to a second rotor blade segment 4B. The fixation part 9 is detachably attached to the means 7 for lifting and/or lowering a rotor blade segment placed on the lifting device 5. The fixation part and the rotor blade segment 4B are lifted up. A coupling guide 10 placed on the fixation part 9 is automatically coupled to a corresponding coupling guide 8 placed on the lifting device 5. When the fixation part 9 and the second rotor blade segment 4B are lifted further up, the self-adjusting coupling guides 8 and 10 are automatically connecting the two rotor blade segments 4A and 4B in a correct angle in relation to one another. When the rotor blade segments 4A and 4B are connected and fixed to each other, the fixation part 9 can be detached from the rotor blade segment 4B and lowered down. If the rotor blade has more than two rotor blade segments 4A and 4B, it will be possible to continue the process by lowering the lifting device to the end of the second rotor blade segment 4B and repeat the above process.

Different types of means for supporting and guiding the frame structure in relation to the rotor blade have been described in the summary of the invention in a general manner, although it has been mentioned that the rear contact means may preferably comprise brush means, e.g. industrial brushes, comprise belts, drums, rollers or the like. The contact means are adapted for transferring a load to the rotor blade in such a manner that the rotor blade is not damaged. The contact means are furthermore adapted to be moved along the surface with only little friction and preferably moves not only linearly, i.e. move in an omnidirectional manner.

In the following, contact means will be described with reference to FIGS. 5-21.

Figure 5:
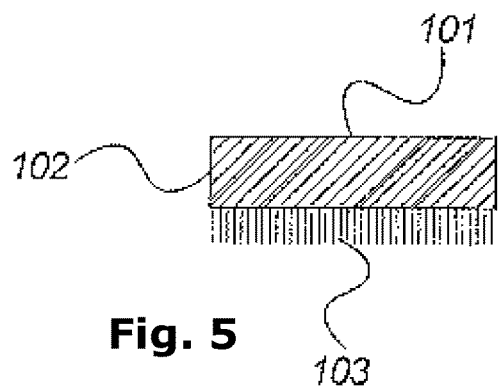
FIG. 5-21 show various contact means and associated devices for use in connection with embodiments of the invention.

FIG. 5 shows a brush contact means 101 in a side view. As shown, the brush contact means 101 comprises a base part 102 carrying a plurality of bristles 103, as mentioned, for example, industrial bristles for e.g. conveying purposes. The brush contact means 101 has the advantage that the bristles adapt to the surface of the rotor blade, that the bristles contact the rotor blade at a large number of positions, that the friction is relatively low, that the bristles are not oriented and may move in any direction, i.e. omnidirectionally, and that in general the bristles are gentle to the surface, whereby load damage, scratches and abrasion can be avoided. The size of the base part 102 and/or the number of bristles 103 may be designed in view of the load that has to be transferred.

Figure 6:
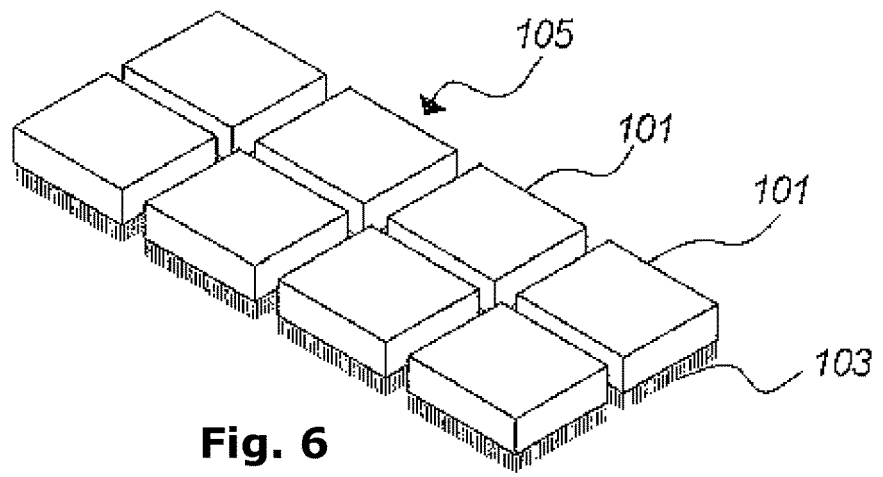

FIG. 6 illustrates that a plurality of such brush contact means 101 may be combined to form a unified contact means 105. The individual brush contact means 101 may be connected to each other in a rigid manner, but preferably they are connected to each other in at least a resilient and flexible manner.

Figure 7:
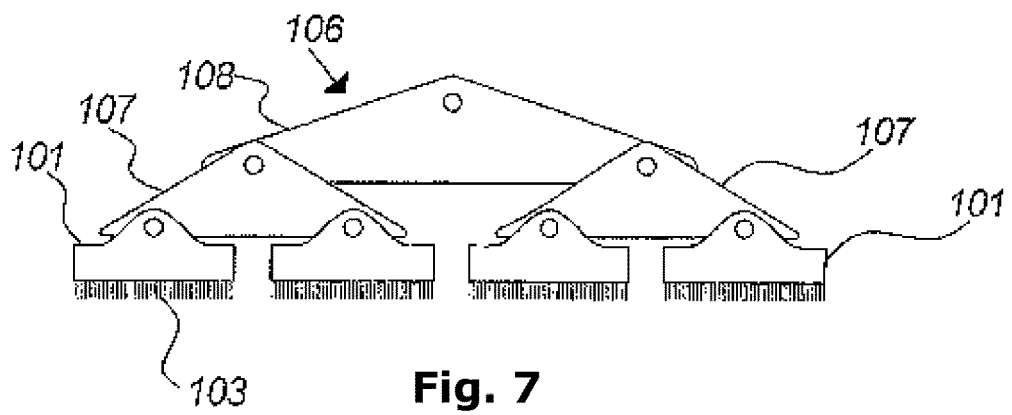

FIG. 7 illustrates how a plurality of brush contact means 101 may be combined to form a contact means 106 that can adapt to the surface by having a number of carriers 107 and 108 connected pivotally to each other and to the brush contact means 101.

Figure 8:
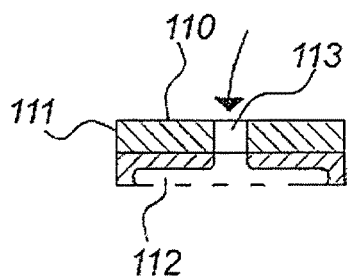

FIG. 8 illustrates a further contact means 110 in a side view. This contact means 110 comprises a base part 111 with an inlet 113 for e.g. compressed air and has an air chamber 112 having outlets (not shown) facing downwards, e.g. a plurality of holes, slits or the like, or air outlets in any suitable form for establishing an air cushion towards the surface of the rotor blade, whereby omnidirectional movement can be achieved.

Further, liquid contact to the surface of the rotor blade may also be used for establishing omnidirectionally movable contact means.

Figure 9:
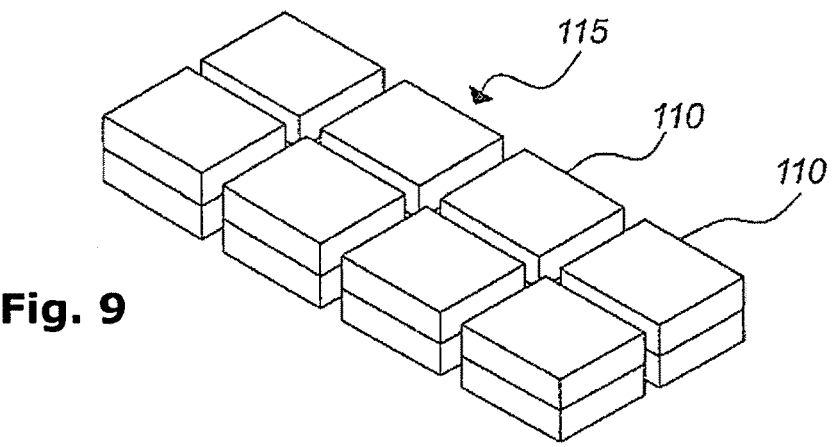

As shown in FIG. 9, a plurality of such air cushion contact means may be combined to form a unified contact means 115 in a manner corresponding to what has been explained above in connection with FIGS. 6 and 7.

Figure 10:
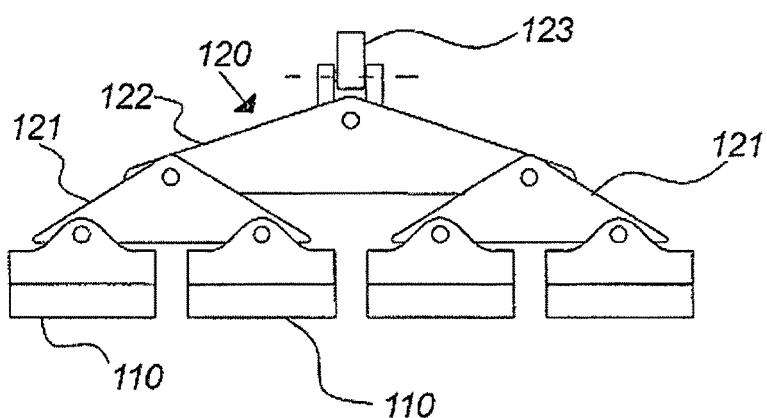
Figure 11:
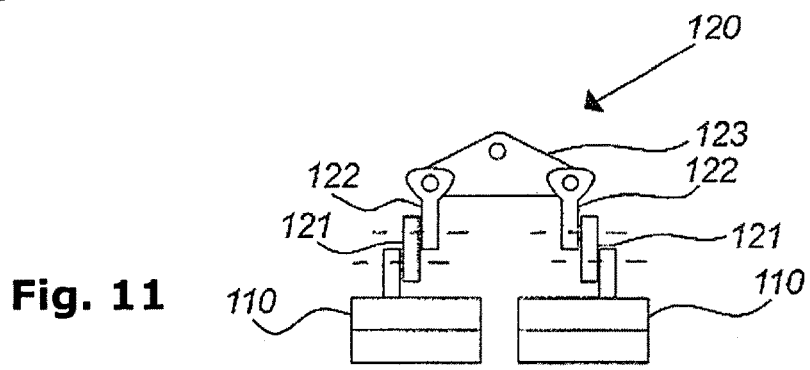

FIGS. 10 and 11 show a further embodiment of a contact means 120, seen from the side and from the end, respectively, where a plurality of modular contact means 110 are combined in a flexible manner. Here, a number of carriers 121, 122 and 123 are connected pivotally to each other and to the brush contact means 110, e.g. in such a manner that pivotal movement is obtained in relation to a plurality of axes, including axes that are perpendicular to each other. Hereby, the contact means may adapt to the curvature of the surface in two directions.

Figure 12:
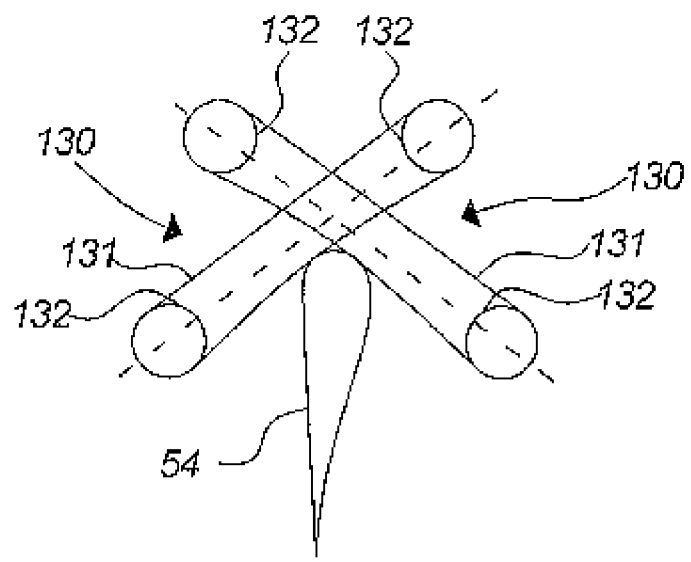
Figure 13:
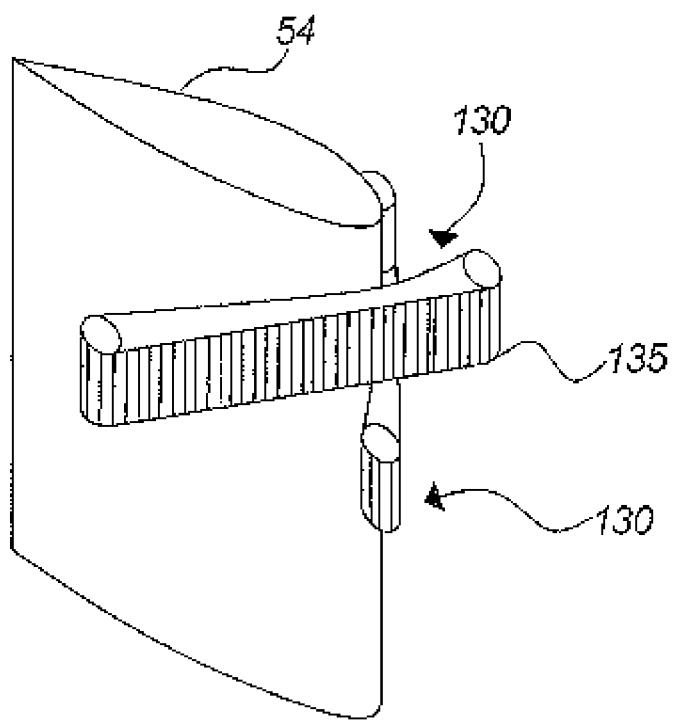

FIG. 12 shows a schematic, sectional view of a rotor blade 54 together with two front contact means 130 also schematically shown. Each of these comprises two drums or the like 132 placed with their axes essentially in parallel with the rotor blade or with only a small angular difference. On these drums or the like 132 a belt-type element 131 is placed, which may move around the drums or the like 132, e.g. effecting a movement in the transverse direction of the rotor blade 54. This arrangement is also illustrated in a schematic manner in FIG. 13 in a perspective view of part of the rotor blade and the front contact means 130. As shown here, the belt-type element 131 may comprise elements 135, which can cause a movement in the longitudinal direction of the rotor blade and which will be described in the following.

Figure 16:
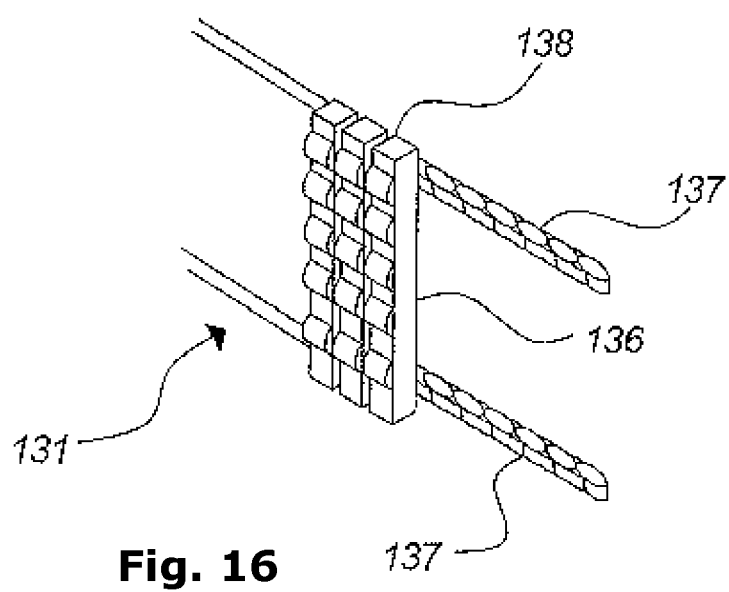
Figure 17:
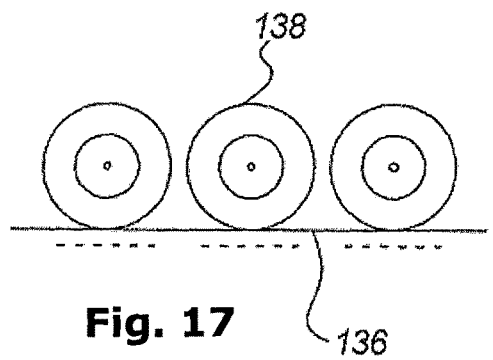
Figure 18:
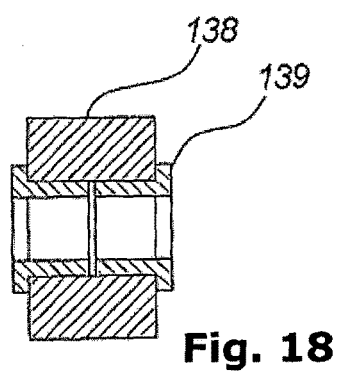
Figure 19:
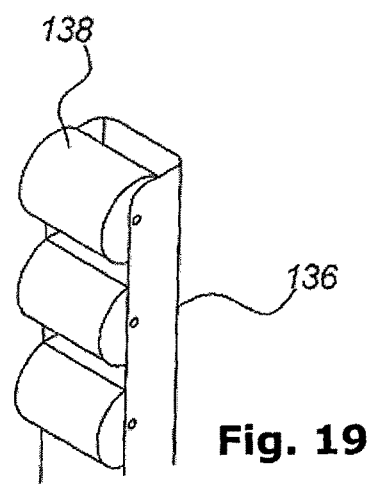

FIG. 16 illustrates such a belt-type element 131, where a pair of flexible elements 137, e.g. chains or the like, carry a plurality of roller elements 136, each one comprising a number of rollers 138 as also shown in FIGS. 17 and 19. FIG. 18 shows such a roller 138 comprising an outer roller carried by bearing means 139.

Figure 14:
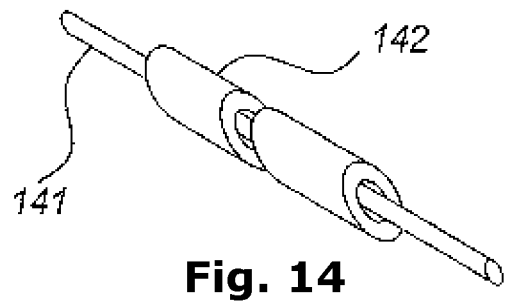
Figure 15:
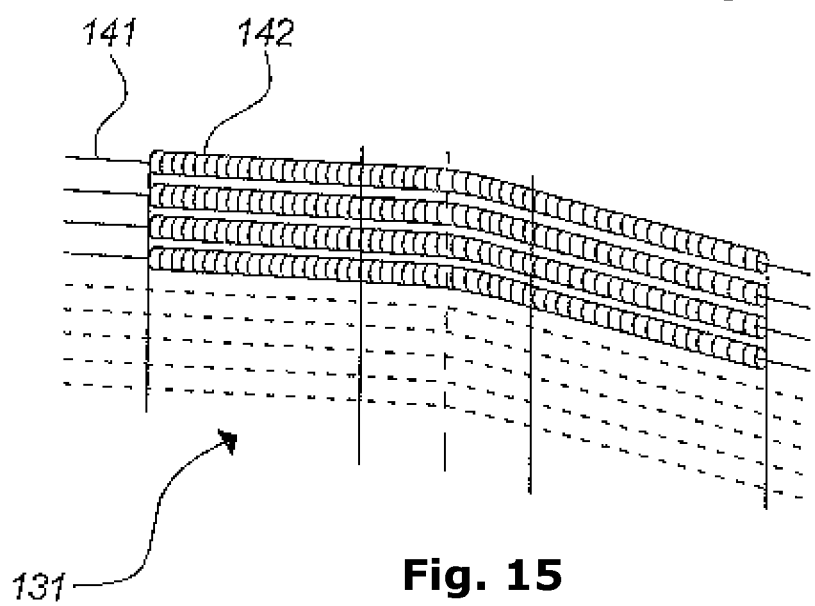

An alternative embodiment of such a belt-type element 131 is illustrated in FIG. 15, where it is shown that the belt-type element 131 may comprise a plurality of flexible elements 141, for example wires, chains, etc. that extend around the drums or the like 132, each carrying a plurality of rollers 142 as also shown in FIG. 14, where a small part of a flexible element 141 is shown with two rollers 142. Thus, it will be understood that such an arrangement will serve to take care of a movement in the longitudinal direction of the rotor blade due to the rollers 142 and will also serve to take care of a movement in the transverse direction of the rotor blade because the flexible elements 141 can be moved in this direction, carried by the drums or the like 132.

Figure 20:
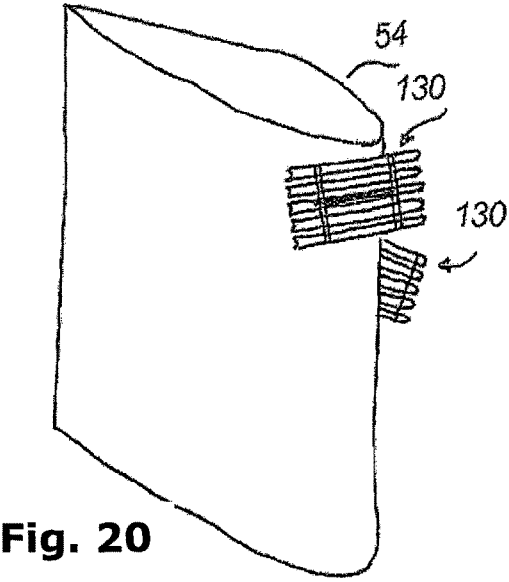
Figure 21:
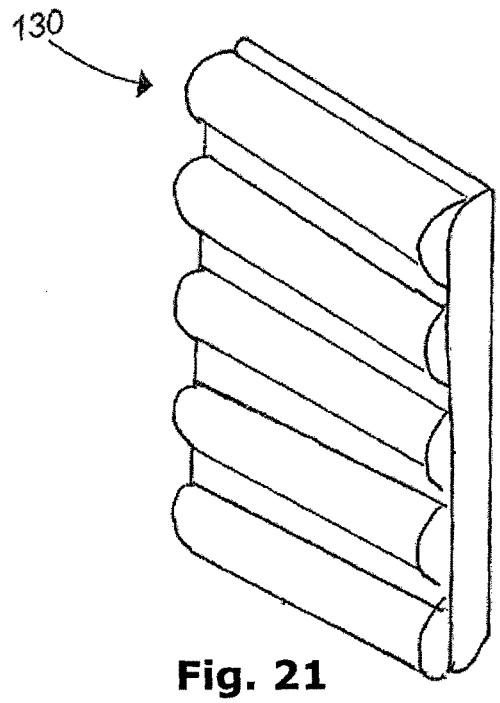

In FIG. 20 a rotor blade 54 and two contact means 130 are shown in a schematic manner in a sectional view. In this view each front contact means 130 comprises five drums, rollers or the like placed with their axes essentially tangentially to the rotor blade. The drums, rollers or the like will be in contact with the rotor blade and serve to take care of a movement in the longitudinal direction of the rotor blade. FIG. 21 illustrates the front contact means 130 from FIG. 20 as a cassette. The cassette carrying the drums, rollers or the like can be pivoted arbitrarily and will thereby serve to take care of a movement in the transverse direction of the rotor blade. Even though the cassette is shown with five drums, rollers or the like, the number of drums, rollers or the like can be both more and less. The length of the drums, rollers or the like and the distance between the drums can also be selected to be different.

It will be understood that other embodiments, variations, etc. are possible when designing such contact means and that combinations hereof are possible as well.

What is claimed is:

1. A lifting device for connecting two rotor blade segments of a wind turbine, said lifting device being adapted for being moved in the longitudinal direction of the rotor blade, the lifting device comprising:
   a frame structure,
   means for supporting and guiding the frame structure in relation to the rotor blade,
   means for lowering and/or lifting the frame structure in relation to the rotor blade, and
   means for lifting and/or lowering a rotor blade segment, wherein the frame structure comprises a first part of a coupling guide for guiding a coupling of a first rotor blade segment and second rotor blade segment, and wherein said means for supporting and guiding the frame structure in relation to the rotor blade comprises a plurality of contact means.

2. A lifting device according to claim 1, wherein the frame structure comprises a plurality of first parts of the coupling guide for guiding the coupling of the first rotor blade segment and the second rotor blade segment.

3. A lifting device according to claim 2, wherein the coupling guide is a self adjusting coupling guide.

4. A lifting device according to claim 1, wherein the coupling guide is a self adjusting coupling guide.

5. A lifting device according to claim 1, wherein said means for supporting and guiding the frame structure in relation to the rotor blade are configured for contacting the rotor blade at regions at or near the front edge of the rotor blade and/or at or near the rear edge of the rotor blade.

6. A lifting device according to claim 1, wherein the frame structure comprises a work platform adapted to carry one or more individuals and/or a tool, a robot, and/or an apparatus for performing the connection of the two rotor blade segments.

7. A lifting device according to claim 1, wherein said means for supporting and guiding the frame structure in relation to the rotor blade are configured for being adjusted to the rotor blade during movement of the lifting device in order to maintain controllable contact at said regions.

8. A lifting device according to claim 1, wherein at least one of said plurality of contact means is adapted for contacting the rotor blade at a plurality of points and/or at adjoining points.

9. A lifting device according to claim 8, wherein said at least one of said plurality of contact means for contacting the rotor blade comprises brush support means or belt support means.

10. A lifting device according to claim 8, wherein said at least one of said plurality of contact means comprises a plurality of balls or rollers.

11. A lifting device according to claim 1, wherein said contact means for contacting the rotor blade comprises brush support means or belt support means.

12. A lifting device according to claim 1, wherein said contact means comprises a plurality of balls or rollers.

13. A lifting device according to claim 1, wherein said means for supporting and guiding the frame structure in relation to the rotor blade comprises means for determining contact load at said regions of the rotor blade, the means for determining contact load including strain gauges and/or weighing cells, thereby facilitating detection and/or measurement of unbalance and variations in wind pressure, variations in rotor blade dimensions, including width, size, and/or shape.

14. A lifting device according to claim 1, wherein said frame structure has an open configuration or is adapted for being opened by having a releasable frame part and/or one or more frame parts that are pivotal.

15. A lifting device according to claim 1, wherein the frame structure further comprises means for supporting the lifting device in relation to a wind turbine tower, said means for supporting the lifting device in relation to the wind turbine tower being configured for displacing the device in relation to said wind turbine tower when the lifting device is transferred to or removed from the rotor blade of a wind turbine.

16. A lifting assembly for connecting two or more rotor blade segments of a rotor blade, the assembly comprising:
   a lifting device being adapted for being moved in the longitudinal direction of the rotor blade, the lifting device comprising:
      a frame structure,
      means for supporting and guiding the frame structure in relation to the rotor blade,
      means for lowering and/or lifting the frame structure in relation to the rotor blade, and
      means for lifting and/or lowering a rotor blade segment,
      wherein the frame structure comprises a first part of a coupling guide for guiding a coupling of a first rotor blade segment and second rotor blade segment, and wherein said means for supporting and guiding the frame structure in relation to the rotor blade comprises a plurality of contact means, and
   a fixation part having means for fixation of a rotor blade segment, the fixation part further comprising means for connecting the fixation part to the means for lifting and or lowering a rotor blade segment placed in connection with the lifting device.

17. The lifting assembly according to claim 16, wherein the fixation part is detachably attached to the means for lifting and or lowering a rotor blade segment placed on the lifting device and movable in relation to the frame structure and carried by said frame structure.

18. The lifting assembly according to claim 16 wherein the fixation part comprises a second part of the coupling guide for guiding the coupling of the first rotor blade segment and the second rotor blade segment.

19. A lifting assembly according to claim 18, wherein the coupling guide is a self-adjusting coupling guide.

* * * * *